(No Model.)
J. BAKER.
METHOD OF PLATING OR FACING INFERIOR WITH SUPERIOR METALS.
No. 552,979. Patented Jan. 14, 1896.
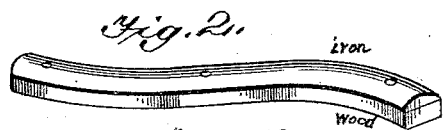
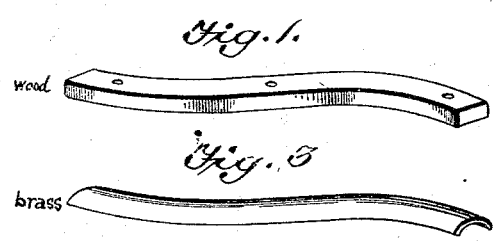
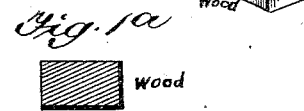
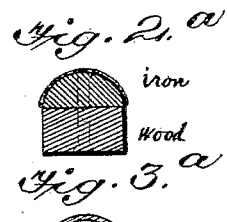
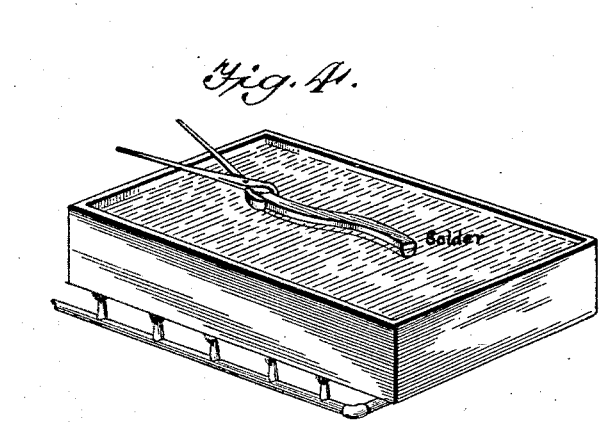
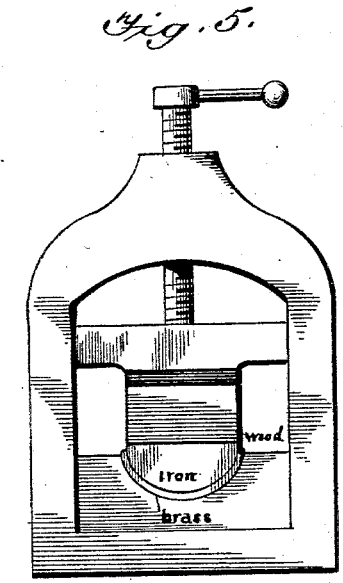
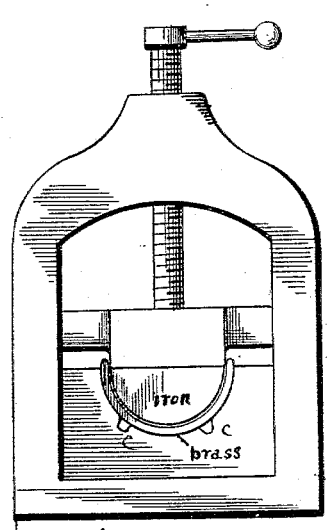
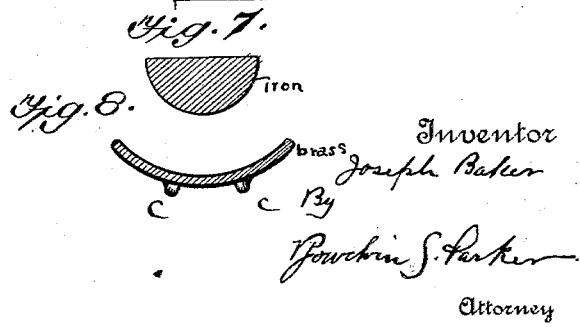
Witnesses
John Immie
Chas. K. Davies.
Inventor
Joseph Baker
By
Bowchin S. Parker
Attorney

UNITED STATES PATENT OFFICE.

JOSEPH BAKER, OF ANDOVER, NEW HAMPSHIRE, ASSIGNOR TO BAKER, CARR & CO., OF SAME PLACE.

METHOD OF PLATING OR FACING INFERIOR WITH SUPERIOR METALS.

SPECIFICATION forming part of Letters Patent No. 552,979, dated January 14, 1896.

Application filed October 1, 1895. Serial No. 564,299. (No specimens.)

*To all whom it may concern:*

Be it known that I, JOSEPH BAKER, of Andover, in the county of Merrimac and State of New Hampshire, have invented a new and useful Improvement in the Method of Plating or Facing an Inferior with a Superior Metal, of which the following, taken in connection with the accompanying drawings, is a specification.

This invention relates to covering an inferior metal with a surface plate or covering of superior metal, and to articles and mechanisms employed for the purpose.

The object of the invention is to secure for articles of common use, such as hames, harness-rings, drawer-pulls, and the like the strength of an iron or steel base, with the ornamental and non-corrodible qualities of a brass, nickel, or alloy surface, the surface metal being in itself somewhat rigid and strong enough to endure much strain and wear.

The common way of covering an iron surface with a brass plating is to take an exceedingly thin sheet of brass and coat one or both surfaces thereof with solder. The sheet-brass so coated is rarely thicker than what is known as "foil" in the market. This thin sheet or foil is laid on the surface of the iron and a hot soldering-iron is passed over the brass, fusing the solder by the transmitted heat and causing it to adhere to both of the other metals as it cools. Some of the objections to this common process are that the heat of the soldering-iron cannot be transmitted through a plate of any considerable thickness; the solder, being melted only in small patches at a time, does not become uniformly adhesive to the other metals; portions of the surface are apt to be skipped by the soldering-iron and no soldering takes place at such points, and the surface of the brass plate is likely to be scratched by the soldering-iron. The entire process is slow and expensive.

Flat plates of hard metal have been joined by passing the same between rollers with a layer of fused solder between them; but so far as I am aware this method of joining plates has not been used and is not adapted for use with metallic plates having irregular surfaces.

By my improved method I am enabled to cover pieces of iron, steel, or other strong metal (or pieces of wood with iron plates thereon, such as some forms of hames) with an ornamental and not easily corrodible surface of a superior metal, such as brass or nickel, in a manner much superior to anything heretofore known in this art. The following description will enable a person skilled in this art to practice the present invention. Slight modifications and changes within the knowledge of the skilled mechanic are intended to be covered by my claims.

I take a piece of iron or steel having a plane convex, or concave, or irregular surface, which surface it is desirable to cover with a strong plating of nickel, brass, or other alloyed or composite metal. The part of the metal to be covered is made clean and bright by being rumbled or ground, or polished by an emery or other polishing wheel or belt, or the surface may be made bright by pickling in acid or alkaline solutions well known in this art. The purpose of this cleaning or polishing is that solder may strongly adhere to the harder and stronger metal. In some instances the iron or steel plate may be attached to a wood backing by rivets or otherwise, and the heads of the rivets which are on the side to be plated are cleaned and polished along with the metal to which they are attached.

The bright iron or steel surface is covered with a wash or flux known as "muriate of zinc," said wash consisting of a chemical combination of zinc and muriatic acid. The iron or steel so washed is immersed in a bath of hot solder, or molten solder is poured on or applied to the face thereof, and permitted to stay in contact therewith until the iron or steel has acquired the temperature of the molten solder, or nearly so. If wood be attached to the iron the wood should not be immersed in the solder, unless protected by the application of a coating of plaster or some non-combustible covering. Usually the wood can be kept so far from the surface of the molten solder that it will not be materially injured by such heating of the iron or steel which has its face in the molten bath. The iron or steel immersed in or in contact with the molten solder becomes covered therewith.

A brass, nickel, or other metal facing-plate has been previously brought to such form that its back approximates the form of the face of iron or steel. If the facing-plate is not very thick, the approximation need not be so accurate as if it be thick and rigid. The back of this plate should be clean and bright, and may be washed with muriate or other suitable flux.

A pair of dies are formed with their pressure surfaces nicely conforming to the desired finished surfaces of the completed article, whether it be a hame, a ring, or what not. If the iron or steel be backed with wood, one member of the die will bear on the wood.

The brass or nickel facing-plate, nearly conforming to its finished shape, is placed in one die member, and the iron or steel plate, covered with hot solder, as described, and of a temperature approximating that of the solder, is placed in the other die member, and the dies are brought together with strong pressure. The brass or nickel plate, if not already of the exact shape required, is compressed by the dies upon the iron or steel surface and firmly attached thereto by the solder as the latter cools. The heat transmitted by the iron or steel through the solder is sufficient to heat the brass or nickel covering to such degree as to secure a very firm and uniform adhesion.

The parts are allowed to cool in the dies, and when removed the brass or nickel facing will remain firmly attached to the iron or steel base and will have been formed or shaped by the die to the desired form as borne by the die, whether originally of that form or not. The final formation of the covering-plate may therefore be ascribed to the action of the dies, but the fixing of the plate in its final position is due to the setting or cooling of the solder interposed between the two harder and more refractory metals.

The facing-plate may have ornamental projections or depressions, and the die in such case will be made to conform thereto. If these variations of surface be accompanied by variations in the back of the brass or nickel plate, said variations, if of slight extent, will be filled by the molten solder, as the entire body of solder is in a molten state at one time, so as to be acted on by pressure from the dies. The solder is not, as in the soldering-iron process, melted little by little, or, as in the roller process, melted and applied along a line, leaving part of the adjacent surfaces of the hard metals attached and part unsoldered while the work is going on.

By the method described I am enabled to face a cheaper with a better metal in superior manner, or to complete the formation of partly-formed articles, and to firmly attach the metallic facing to the metallic backing thereof at one and the same operation, and this I believe to be an important new step in this art.

The accompanying drawings are intended to illustrate in a diagrammatic way various materials and mechanisms which may be employed in the process.

Figure 1 is intended to show in perspective the wooden part of a hame. Fig. 1ᵃ is a section of the same; Fig. 2, the same or a similar wooden hame, with a steel body-piece attached by rivets. Fig. 2ᵃ, a cross-section thereof; Fig. 3, a brass (or equivalent metal) face-plate, and Fig. 3ᵃ the section thereof. Faces of the steel and brass are preferably covered with flux, as described. Fig. 4 illustrates a bath of molten solder, in which the steel is immersed far enough to receive a coating of solder on the flux and to heat the steel, the wood being protected as described when the metal and wood are together applied to the bath. Fig. 5 is an elevation of a die and press, showing the hame therein. Fig. 6 is a partial elevation and partial section of dies and die press, with an iron piece therein and brass facing applied. Fig. 7 is a cross-section of a bar of iron with one face rounded, and Fig. 8 a section of a plate of nickel or brass having ornamental projections c. The plating metal, as shown, does not conform to the surface of the iron, but is made to conform thereto by the dies of Fig. 6, as will be readily understood.

With the above explanation it is believed this invention will be fully understood by those skilled in this art. After the plating has been applied in the die-press, the edges may be trimmed by grinding or in other suitable and usual manner and the surface will be buffed, polished, engraved, or otherwise ornamented in any usual manner.

For ornamental railings, embellishments for furniture, and for some parts of stoves this method of applying a heavy plate of a superior metal to an inferior metal is believed to be well adapted.

What I claim is—

1. The method of plating or covering a surface of a rigid piece of iron, steel, or like metal, which consists in placing the surface of said metal in contact with a molten solder, and heating the metal solely by heat transmitted from said solder, then applying to said hot metal, covered with the solder, a plating of brass or metal as described, and compressing the whole between dies until the solder has cooled to adhere to the other metals, substantially as described.

2. The method of covering a surface of a rigid piece of metal, which consists in placing this surface in contact with molten solder the heat from the molten solder alone serving to raise the rigid metal to a high temperature and causing it to remain coated with hot solder, then applying to such coated surface a plating of a different metal approximating the shape of the surface to be covered, and by the pressure of dies completing the formation of the plating metal on the solder covered surface, and retaining the metals in contact until the solder has cooled, substantially as described.

3. The method of covering an uneven surface of rigid metal, which consists in cleaning and applying a flux thereto, then immersing the surface in a bath of molten solder, thereby heating the same and while hot and covered with solder applying to said uneven surface a plating approximating the surface to be covered, said plating having a flux thereon, and completing the plate formation and retaining the parts in contact by die pressure until the solder has set, all substantially as described.

4. The method of covering a surface of rigid metal having a wooden backing, which consists in riveting the wood and metal together, cleaning the metal surface and rivet heads and applying a flux thereto, covering the metal surface with molten solder thereby heating the metal while protecting the wood from the action of heat, applying the metal covered with solder to a plate of metal approximating the surface form of the rigid metal, and by die pressure retaining the parts in contact until the solder cools and retains the plating, all substantially as described.

5. The step in the art of covering a rigid piece of metal with a facing of superior metal, which consists of placing the base metal in a bath of molten solder, retaining it in contact with the solder until it approximates the heat of the solder by heat absorbed entirely from the solder and has acquired a coating thereof, and applying it with pressure to the metal covering plate previously formed to approximate the shape of the base, all substantially as described.

In testimony whereof I have signed my name to this specification, in the presence of two subscribing witnesses, on this 21st day of September, A. D. 1895.

JOSEPH BAKER.

Witnesses:
   GEORGE W. STONE,
   J. G. WHITCOMB.